United States Patent [19]

DeCoste, Jr. et al.

[11] Patent Number: 4,740,416
[45] Date of Patent: Apr. 26, 1988

[54] NOVEL ADHESIVE TAPES

[75] Inventors: Leonard D. DeCoste, Jr., Stoneham; Abboud L. Mamish, Natick, both of Mass.

[73] Assignee: The Kendall Company, Boston, Mass.

[21] Appl. No.: 77,574

[22] Filed: Jul. 24, 1987

Related U.S. Application Data

[63] Continuation-in-part of Ser. No. 923,939, Oct. 28, 1986, Pat. No. 4,705,715.

[51] Int. Cl.$^4$ ................................................ B32B 3/26
[52] U.S. Cl. .................................... 428/240; 428/241; 428/283; 428/313.5; 428/313.9; 428/317.3; 428/317.5; 428/325; 428/327; 428/354; 428/355
[58] Field of Search ............. 428/240, 241, 283, 313.5, 428/313.9, 317.3, 317.5, 325, 327, 354, 355, 906

[56] References Cited

U.S. PATENT DOCUMENTS

| | | | |
|---|---|---|---|
| 4,376,151 | 3/1983 | Parrotta | 428/313.9 |
| 4,427,737 | 1/1984 | Cilento et al. | 428/317.3 |
| 4,556,595 | 12/1985 | Ochi | 428/327 |
| 4,610,836 | 9/1986 | Wycech | 428/313.9 |
| 4,612,242 | 9/1986 | Vesley et al. | 428/317.5 |
| 4,693,920 | 9/1987 | Agarwal et al. | 428/355 |

*Primary Examiner*—William J. Van Balen
*Attorney, Agent, or Firm*—Alvin Isaacs

[57] ABSTRACT

Novel adhesive tapes consisting essentially of, in order, (1) a layer comprising glass or resin microspheres dispersed in a polymeric matrix; (2) a cloth scrim or reinforcing fabric; and (3) a layer of adhesive, preferably a pressure-sensitive adhesive.

12 Claims, No Drawings

NOVEL ADHESIVE TAPES

RELATED APPLICATION

This application is a continuation-in-part of application Ser. No. 923,939 filed Oct. 28, 1986, now U.S. Pat. No. 4,705,715.

BACKGROUND OF THE INVENTION

The present invention is directed to a novel laminar tape structure in which a cloth scrim is sandwiched between an outer backing element and an adhesive layer. Since it is particularly useful in the preparation of so-called duct tapes, it will be described hereinafter by reference thereto.

As is well known in the art, duct tapes are customarily employed for such purposes as seaming metal ductworks, securing insulation and the like.

While in its simplest form, an adhesive tape may consist of a layer of adhesive coated onto a backing sheet in what may be called a two-layer structure, duct tapes should be strong as well as flexible. Consequently, an intermediate cloth layer or scrim is sandwiched between the adhesive layer and backing for increased strength in typical commercially available duct tapes.

In such commercially available duct tapes, the adhesive layer will in general be any of the per se known pressure-sensitive adhesives, e.g. an acrylic or rubber-based pressure-sensitive adhesive, and the backing will comprise a polyolefin, e.g. polyethylene.

Duct tapes of this description are entirely satisfactory for their intended usage and accordingly have achieved wide market acceptance. Nevertheless, it will be appreciated that, like any commercially available product, there is always a great need for cost effective manufacturing whereby the cost for producing a tape of comparable end use properties may be significantly reduced.

The aforementioned parent application, Ser. No. 923,939 is directed to the task of providing such a cost effective tape. In considering how to solve this task, the individual components or elements which constitute the product were considered and it was concluded that little or no cost savings could be realized by substitution of materials for the adhesive and cloth scrim. Consequently, attention was focused on the polyolefin backing which was typically on the order of about 5 mils thick and, in terms of raw materials, constituted a significant portion of the total cost.

In accordance with the invention described and claimed in the parent application, the task is solved in an elegant manner by substituting for the conventional backing material a foam tape backing provided with a thin outer skin. The novel tapes of the parent application therefore comprise a laminar structure consisting essentially of, in order, a thin skin outer layer; a layer of foam; a cloth scrim; and a layer of adhesive, e.g. a per se known pressure-sensitive adhesive.

BRIEF DESCRIPTION OF THE INVENTION

The present invention is directed to adhesive tape structures of the type described and claimed in the parent case, the essence of the invention being the use of a specific type of foam layer, namely a layer which visually looks like a foam layer but physically comprises a discontinuous phase of glass or resin microspheres (sometimes referred to in the literature as "beads") dispersed in a polymeric continuous phase, e.g. a polyolefinic matrix. With the foam layer of this invention, the need for a thin skin backing is obviated.

DETAILED DESCRIPTION OF THE INVENTION

As was mentioned previously, the parent application is directed to a cost effective adhesive tape having an intermediate cloth layer for reinforcement and increased tensile strength, e.g. adhesive tapes of the type generally referred to in the art as duct tapes, the essence of the invention being the concept of replacing the polyolefin or other backing layer with a foam layer having an outer skin bonded thereto.

In its simplest form, duct tapes comprise a cloth material carrying an adhesive layer. While in theory the adhesive coating could comprise any of the per se known heat- or water-activated adhesives, for ease of application by the user it will usually be one of the known pressure-sensitive adhesives. Useful adhesives for this purpose include acrylic or rubber based adhesive formulations. As will be well understood by those skilled in the art, such formulations also typically contain tackifiers, fillers and other components performing specific functions. Since a suitable adhesive for this purpose per se comprises no part of this invention and its selection will be a matter of individual choice within the expected judgment of the skilled worker, useful adhesives need not be discussed in further detail.

The cloth material employed will preferably be a woven web for easy tearability in the cross direction (CD), as distinguished from nonwovens which, due to their primary orientation in the machine direction (MD) are not readily tearable in the CD. Useful woven webs of this description may be made from known natural and synthetic fibers and also per se comprises on part of this invention.

For flexibility as well as the ability to manufacture the tape in roll form, the cloth ordinarily should not have a dense thread count. Consequently, with the woven cloths of lesser thread count density which would be employed, the adhesive layer will tend to flow through the cloth, making the resulting product commercially unacceptable.

For this reason, duct tapes typically have an outer plastic layer laminated to the cloth layer. This plastic layer, which may be on the order of 4-6 mils thick, and may comprise any of the per se known flexible plastic support materials, e.g. a cellulose ester such as cellulose acetate, cellulose triacetate, and the like; a polyester such as polyethylene terephthalate, or a polyolefin such as polyethylene or polypropylene, the polyolefins being particularly useful backing materials.

In accordance with the invention described and claimed in the parent application, a significant savings in the cost of the backing material is obtained if the solid plastic backing heretofore employed is replaced by a foam having a thin outer skin.

The thin outer skin is an essential part of that present invention.

Initial prototypes contemplated by Applicants that were contemplated for lowering the manufacturing cost consisted of only a single foam layer coated onto the cloth. However, the foam backing in these early prototypes exhibited cell distortion and film delamination upon unwinding from the tape roll. This problem was solved efficiently and elegantly by providing the thin protective outer skin.

Preferable, the foam and outer skin are coextruded onto the cloth scrim. Rather than being a discrete two-layer top coat on the scrim, the extruded foam melt permeates the interstices of the cloth so that the cloth fibers may be said to be embedded in the foam layer. A layer of adhesive, e.g. a per se known pressure-sensitive adhesive, is then provided on the opposed surface thereof.

The outer skin should be as thin as possible and may be on the order of 3 mils or less. The foam, on the other hand, should be appreciably thicker, e.g. on the order of 4-8 mils. In the preferred embodiment, both the skin and the foam comprise polyethylene, a low density polyethylene (LDPE) being particularly preferred. However, other materials such as polypropylene are also contemplated for the backing.

The cloth web may be selected from any of the known web materials such as those heretofore employed in the manufacture of tapes. It may be made from natural or synthetic fibers and may, for example, be on the order of 2-8 mils thick.

The adhesive layer may be on the order of 3-6 mils thick and, as previously stated, it is preferably a per se known pressure-sensitive adhesive, e.g. a rubber-based or acrylic adhesive formulation whose selection comprises no part of this invention and need not be discussed in further detail.

The novel tapes of the parent application can be assembled by individually producing and sequentially coating the components parts. For example, the foam, skin and cloth may be individually supplied to a calendering operation to provide a laminar structure of these three components. An adhesive layer may then be coated onto the cloth substrate by known coating techniques.

However, the preferred method of manufacture in accordance with this invention utilizes per se known extrusion techniques wherein the foam and skin are coextruded onto the cloth web.

As is described in the parent application, Ser. No. 923,939, a chemical blowing agent (CBA) was preferably utilized to produce the foam and, in the most preferred embodiment, use was made of known coextrusion equipment for simultaneous extrusion of a LDPE foam and an LDPE skin. As is explained therein, for optimum results, good mixing between the CBA and polyethylene pellets is required to obtain substantially uniform cell distribution; and fairly precise temperature control should also be maintained throughout the foam extrusion processing in order to produce an optimum foam film.

It is further stated therein that direct injection of a gas or volatile liquid into the polymer melt is another method that may be used to produce the foam. However, it has the disadvantage of requiring complex equipment. It is also suggested therein that other known means such as physical foaming may be employed in lieu of a CBA and may, in fact, be preferable.

The present invention is also directed to cost effective adhesive tapes having a foam layer carrying an adhesive layer on one surface thereof. However, in accordance with the present invention, what may be regarded as the foam layer is provided simply and efficiently by dispersing glass or resin microspheres or beads as a discontinuous phase in a polymeric matrix, e.g. LDPE, continuous phase in lieu of providing a foam consisting of air or gas voids in the polymeric matrix, as disclosed in the parent case.

From a nontechnical standpoint, a "foam" may be defined as a material in a lightweight cellular spongy or rigid form produced by introducing gas bubbles into a plastic or resin (cf "Webster's Third New International Dictionary"). However, from a technical standpoint, the per se known use of polymeric films containing microspheres is sometimes referred to in the art as "syntactic foams." Both visually and in photomicrographs, the microspheres appear similar to gas or air voids and accordingly the microsphere-containing polymeric layers of this invention may be regarded as being substantially identical in structure and function to the gas-containing polymers which would more conventionally be termed "foams" and which are disclosed, for example, in the parent application.

As previously mentioned, the foam tapes of the parent case contained a thin outer skin as an essential component. It has been found that the foams of the present invention, which contain microspheres instead of gas pockets in the continuous matrix material, do not require the thin skin backing.

Thus, while they cannot be fairly stated to be superior in function in any manner to the foam tapes of the parent case, from a manufacturing standpoint, they do offer the advantage of elimination of a component, namely the outer skin.

Further, they do not require the fairly precise temperature control which, as previously stated, is required in the use of a CBA to produce the foam. Moreover, as stated in the parent application, a high pressure is required after decomposition of the CBA to avoid premature cell expansion and coalescence.

Also, with respect to the alternate use of direct injection of a gas or volatile liquid to produce the foam, complex equipment is required. Further, as discussed in the parent case, nucleating agents are important in direct injection foaming in order to control cell morphology such as the number of cells formed, cell size and cell distribution.

In contradistinction, the foams prepared in accordance with this invention may be prepared simply and accurately by uniformly mixing precise quantities of microspheres and polymer melt.

By way of recapitulation, the adhesive tapes of this invention comprise a laminar structure consisting essentially of, in order, (1) a layer of foam comprising glass or resin microspheres dispersed in a polymeric matrix; (2) a cloth scrim or reinforcing fabric; and (3) a layer of adhesive, e.g. a per se known pressure-sensitive adhesive.

The foam layer should be 9 mils or less, e.g. on the order of 4-9 mils and will preferably comprise a polyolefin, most preferably a polyethylene such as a low density polyethylene (LDPE). However, other polymeric materials such as polypropylene are also contemplated.

The microspheres or beads which are employed can be any of those such as are heretofore known and commercially available. While glass is preferred, resin or plastic microspheres may also be used provided, of course, they possess (as they typically do) a higher melting point than the LDPE or other polymer which is melted for admixture and subsequent coating.

The microspheres may have a diameter in the range of from about 0.1 to about 300 microns, but more typically it will be on the order of from about 1-5 microns. They may, for example, possess a density on the order of 0.036 to 2.6 g/cm$^2$. They may be employed in a ratio by weight to polymer of from about 1:20 to about 1:5.

The foam layer may, if desired, contain other reagents performing specific desired functions, e.g. a colorant or pigment, a flame retardant, etc.

As was previously stated, the cloth web or scrim may be selected from any of the known web materials such as those heretofore employed in the manufacture of tapes and/or disclosed in the parent application. It may be made from natural or synthetic fibers and may, for instance, be on the order of 2–8 mils thick. Preferably, it will be a woven web for easy tearability in the cross direction (CD). However, so-called "finger tearability," although desirable, is not a critical limitation in the practice of this invention.

The adhesive layer may be on the order of 3–6 mils thick and, as previously mentioned, is preferably a per se known and conventional pressure-sensitive adhesive, e.g. a rubber-based or acrylic adhesive formulation, the selection of which comprises no part of this invention.

The novel tapes of this invention may be made by dry blending the polymeric backing, e.g. polyethylene, with the microspheres on a two-roll mill or other mixing device to form a polymeric melt in which the microspheres are substantially uniformly dispersed as a discontinuous phase in the polymeric continuous phase matrix; casting the melt onto one surface of the cloth material; and thereafter applying an adhesive layer, e.g. by calendering, onto the opposed surface of the cloth material.

Since the resulting foam backing has the microspheres rather than gas "pockets," the resulting foam backing does not require a thin outer skin to protect against diffusion or migration of the adhesive through the backing, cell distortion and/or delamination, as was the case in the parent application. However, it is contemplated that a thin outer skin may be provided if found desirable or expedient to do for aesthetic or other reasons.

By way of illustration, a foam duct tape may be prepared in accordance with this invention by blending on a two-roll mill one hundred parts by weight of low density polyethylene, five parts by weight of glass microspheres having a diameter in the range of 1–5 microns and five parts by weight of grey concentrate (for color) to provide a grey polymer melt which is then cast onto a polyester woven cloth scrim at a thickness on the order of 5.5 mils. Thereafter a 3.6 mil adhesive layer is coated onto the opposed surface of the cloth scrim.

As stated previously, while polyethylene is the preferred backing material, other materials may be employed. In the selection of suitable materials, in general such factors as cost, flexibility, cohesion and compatibility (e.g. polarity and wettability) are to be considered. In general, it is contemplated that other polyolefins such as polypropylene and various ethylene copolymers such as ethylenevinylacetate, ethyleneacrylic acid, ethylenemethylacrylate and the like may be employed to produce the foam and/or skin. In any event, the substitution of other materials for the polyethylene in the illustrative example will be a matter of individual choice within the expected judgment of the skilled worker, as will be the particular thicknesses of the backing materials and/or adhesives.

In the foregoing description, reference has been made to the use of woven cloth webs because of their tearability in the cross direction. If finger tearability is not a consideration and mechanical severance in the CD is instead contemplated and acceptable, it will be appreciated that nonwovens may be employed instead.

Accordingly, as used herein and in the appended claims the term "cloth" denotes both woven and nonwoven cloth fabrics.

In lieu of applying the foam directly on the cloth material, as heretofore described, it would be within the scope of this invention to provide an intermediate layer, e.g. a tie-coat to increase adhesion. In like manner, the tie coat, primer or other layer may be provided between the adhesive coating and the cloth.

Since certain changes may be made without departing from the scope of the invention herein described, it is intended that all matter contained in the foregoing description, including the examples and drawings shall be taken as illustrative and not in a limiting sense.

What is claimed is:

1. In an adhesive tape comprising an adhesive layer coated onto a backing comprising a cloth material and an outer layer of a polymeric material,
    the improvement wherein said outer layer comprises a continuous matrix of said polymeric material having microspheres dispersed therein as a discontinuous phase.

2. An adhesive tape as defined in claim 1 wherein said microspheres are glass.

3. An adhesive tape as defined in claim 1 wherein said microspheres have a diameter in the range of from about 0.1 to about 300 microns.

4. An adhesive tape as defined in claim 1 wherein said microspheres have a density of from about 0.036 to 2.6 grams per square centimeter.

5. An adhesive tape as defined in claim 1 wherein the ratio by weight of said microspheres in said discontinuous phase to said polymeric matrix material is from about 1:20 to about 1:5.

6. An adhesive tape as defined in claim 1 wherein said polymeric material comprises a polyolefin.

7. An adhesive tape as defined in claim 6 wherein said polyolefin is polyethylene.

8. An adhesive tape as defined in claim 1 wherein said outer layer is no thicker than 9 mils.

9. An adhesive tape as defined in claim 1 wherein said adhesive layer comprises a pressure-sensitive adhesive.

10. In an adhesive tape comprising a backing layer carrying a cloth material and a layer of a pressure-sensitive adhesive on one side thereof:
    the improvement wherein said backing layer comprises a polyethylene matrix no thicker than 9 mils having dispersed therein a plurality of microspheres having a diameter of from about 0.1 to about 30 microns, the ratio of said microspheres to said polyethylene being from about 1:20 to about 1:5

11. An adhesive tape as defined in claim 10 wherein said microspheres have a diameter from about 1 to about 5 microns.

12. An adhesive tape as defined in claim 10 wherein said microspheres are glass.

* * * * *